(12) United States Patent
An

(10) Patent No.: US 10,488,585 B2
(45) Date of Patent: Nov. 26, 2019

(54) POLARIZATION CONTROLLER

(71) Applicant: ELECTRONICS AND TELECOMMUNICATIONS RESEARCH INSTITUTE, Daejeon (KR)

(72) Inventor: Shinmo An, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/870,836

(22) Filed: Jan. 12, 2018

(65) Prior Publication Data

US 2018/0292605 A1 Oct. 11, 2018

(30) Foreign Application Priority Data

Apr. 11, 2017 (KR) .......................... 10-2017-0046909

(51) Int. Cl.
*G02B 6/10* (2006.01)
*G02B 6/27* (2006.01)
*F21V 8/00* (2006.01)

(52) U.S. Cl.
CPC ........... *G02B 6/105* (2013.01); *G02B 6/0036* (2013.01); *G02B 6/2766* (2013.01)

(58) Field of Classification Search
CPC .................................. G02B 6/10; G02B 6/27
USPC ........................................................... 385/11
See application file for complete search history.

(56) References Cited

U.S. PATENT DOCUMENTS

| | | | | |
|---|---|---|---|---|
| 4,915,503 A * | 4/1990 | Pavlath | .................. | G01C 19/72 356/460 |
| 7,043,134 B2 * | 5/2006 | Berini | ................ | G02B 6/12007 385/147 |
| 7,532,790 B2 * | 5/2009 | Smith | ................ | G02B 6/12007 385/129 |
| 7,949,210 B2 * | 5/2011 | Durfee | .................... | G02F 1/035 385/1 |
| 8,417,070 B2 * | 4/2013 | Block | .................... | B82Y 20/00 385/12 |
| 8,873,894 B2 * | 10/2014 | Kim | ........................ | G02B 6/00 385/14 |
| 8,958,272 B1 * | 2/2015 | Cao | ........................ | G11B 5/314 369/13.33 |

(Continued)

FOREIGN PATENT DOCUMENTS

KR        10-1211226 B1    12/2012
KR    10-2013-0031597 A     3/2013

OTHER PUBLICATIONS

Long Chen et al., "Compact polarization rotator on silicon for polarization-diversified circuits", Feb. 15, 2011 / vol. 36, No. 4 / Optics Letters, p. 469-471.

(Continued)

*Primary Examiner* — Kaveh C Kianni
(74) *Attorney, Agent, or Firm* — Rabin & Berdo, P.C.

(57) ABSTRACT

Provided is a polarization controller. The polarization controller includes a substrate, a first core disposed on the substrate and having a rectangular parallelepiped shape, a first cladding layer configured to cover the first core and the substrate and including a groove parallel to the first core in an edge of an upper end thereof, and a metal pattern disposed in the groove and including a first side surface and a bottom surface, which are adjacent to the first core.

17 Claims, 14 Drawing Sheets

(56) References Cited

U.S. PATENT DOCUMENTS

| | | | | |
|---|---|---|---|---|
| 8,965,156 B2* | 2/2015 | Klein | G02B 6/12007 | 385/1 |
| 9,500,807 B2* | 11/2016 | Oka | G02B 6/1228 | |
| 2003/0223672 A1* | 12/2003 | Joyner | G02B 6/12011 | 385/14 |
| 2005/0018949 A1* | 1/2005 | Yan | B82Y 20/00 | 385/14 |
| 2005/0063644 A1* | 3/2005 | Park | B82Y 20/00 | 385/42 |
| 2005/0089261 A1* | 4/2005 | Shimazaki | G01N 21/553 | 385/12 |
| 2006/0109471 A1* | 5/2006 | Lin | G01N 21/553 | 356/445 |
| 2007/0103755 A1* | 5/2007 | Furuyama | H01S 5/10 | 359/211.1 |
| 2008/0008418 A1* | 1/2008 | Smith | G01N 21/648 | 385/32 |
| 2009/0134486 A1* | 5/2009 | Fujikata | H01L 31/022408 | 257/449 |
| 2010/0014808 A1* | 1/2010 | Flammer | B82Y 20/00 | 385/37 |
| 2010/0017922 A1* | 1/2010 | Shin | B82Y 20/00 | 850/21 |
| 2010/0238580 A1* | 9/2010 | Shimazawa | G11B 5/314 | 360/59 |
| 2011/0250402 A1* | 10/2011 | Oldham | G01N 21/648 | 428/172 |
| 2012/0014837 A1* | 1/2012 | Fehr | B01L 3/502707 | 422/82.11 |
| 2012/0075967 A1* | 3/2012 | Chou | G02B 5/008 | 369/13.33 |
| 2012/0117791 A1* | 5/2012 | Hara | G02B 6/4202 | 29/603.07 |

OTHER PUBLICATIONS

Mariam Aamer et al., "CMOS Compatible Silicon-on-Insulator Polarization Rotator Based on Symmetry Breaking of the Waveguide Cross Section", IEEE Photonics Technology Letters, vol. 24, No. 22, Nov. 15, 2012, p. 2031-2034.

Jing Zhang et al., "An Ultracompact Surface Plasmon Polariton-Effect-Based Polarization Rotator", IEEE Photonics Technology Letters, vol. 23, No. 21, Nov. 1, 2011, p. 1606-1608.

Hiroshi Fukuda et al., "Polarization rotator based onsilicon wire waveguides" Feb. 18, 2008 / vol. 16, No. 4 / Optics Express p. 2628-2635.

F. H. Groen et al., "Compact Polarisation Converter on InP/InGaAsP using an asymmetrical waveguide", Jan. 2003.

D. Vermeulen et al., "High Efficiency Broadband Polarization Rotator on Silicon-on-Insulator", Sep. 1-3, 2010, IEEE, p. 42-44.

Hang Guan et al., "Ultracompact silicon-on-insulator polarization rotator for polarization diversified circuits", Aug. 15, 2014 / vol. 39, No. 16 / Optics Letters, p. 4703-4706.

Daoxin Dai et al., "Novel concept for ultracompact polarization splitter-rotator based on silicon nanowires", May 23, 2011 / vol. 19, No. 11 / Optics Express, p. 10940-10949.

J. Niklas Caspers et al., "Compact hybrid plasmonic polarization rotator", Nov. 15, 2012 / vol. 37, No. 22 / Optics Letters, p. 4615-4617.

Jingyee Chee et al., "CMOS compatible polarization splitter using hybrid plasmonic waveguide", Nov. 5, 2012 / vol. 20, No. 23 / Optics Express p. 25345-25355.

Huijuan Zhang et al., "Efficient and broadband polarization rotator using horizontal slot waveguide for silicon photonics", Applied Physics Letters 101, Jul. 10, 2012, p. 021105-1-021105-4.

Aitor V. Velasco et al., "Ultracompact polarization converter with a dual subwavelength trench built in a silicon-on-insulator waveguide", Feb. 1, 2012 / vol. 37, No. 3 / Optics Letters, p. 365-367.

\* cited by examiner

POLARIZATION CONTROLLER

CROSS-REFERENCE TO RELATED APPLICATIONS

This U.S. non-provisional patent application claims priority under 35 U.S.C. § 119 of Korean Patent Application No. 10-2017-0046909, filed on Apr. 11, 2017, the entire contents of which are hereby incorporated by reference.

BACKGROUND

The present disclosure herein relates to a polarization controller.

As the rapid development of computer and internet technologies in the information society, there is a demand for techniques for quickly processing various types of large-volume information. Existing technologies, which rely on electronic technology based on a copper wiring, are limiting in terms of the throughput and speed. To meet the demands of the high-speed information communication society, it is essential to develop optical transmission technologies that accommodate a large amount of information capacity.

The high-speed information communication systems using coherent technologies in the development of optical communication technologies are being developed from the existing (on-off keying) direct amplitude modulation manner, in which a light intensity is modulated, to a phase shift keying (PSK)-phase modulation manner, in which a phase of an optical signal is modulated or a manner in which the phase and the light intensity are modulated at the same time. The coherent optical communication technologies may use transverse electric (TE)/transverse magnetic (TM) light, which is orthogonal to polarization of a signal, in addition to phase components of the optical signal. In a polarization multiplexing manner that is one of the coherent optical communication technologies, the TE light and the TM light may be independently modulated and then combined with each other to transmit light. Thus, data may be doubly expanded in capacity. Also, in the coherent optical communication technologies, a polarization modulation manner of modulating a polarization state to transmit a signal, such as modulating the intensity and phase of light, is also applicable.

SUMMARY

The present disclosure provides a polarization controller that is capable of converting light having one component that is linearly polarized into light having a different component that is linearly polarized.

An embodiment of the inventive concept provides a polarization controller includes: a substrate; a first core disposed on the substrate and having a rectangular parallelepiped shape; a first cladding layer configured to cover the first core and the substrate and comprising a groove parallel to the first core in an edge of an upper end thereof; and a metal pattern disposed in the groove and comprising a first side surface and a bottom surface, which are adjacent to the first core. The polarization controller may receive first light that is linearly polarized to a first polarization axis to output light that is linearly polarized to a second polarization axis rotating with respect to the first polarization axis.

A horizontal distance from a center of the first core to the first side surface may be greater than about 0 μm and less than or equal to about 3 μm.

A vertical distance from a top surface of the first core to the bottom surface of the metal pattern may be greater than about 0 μm and less than or equal to about 3 μm.

The metal pattern may have a thickness of about 100 nm to about 5 μm

The substrate may further include a protrusion protruding toward the first core, and the polarization controller may further include a second cladding layer disposed between a top surface of the first core and the first cladding layer.

The polarization controller may further include a second core disposed on the substrate and spaced apart from the first core, wherein the second core may have a height equal to a width of the first core, and the second core may have a width equal to a height of the first core.

A distance between the first core and the second core may range from about 10 nm to about 3 μm.

A horizontal distance from a middle point between the first core and the second core to the first side surface may be greater than about 0 μm and less than or equal to about 3 μm.

The metal pattern may be spaced apart from all of the first core and the second core.

The first core and the second core may have the same effective reflective index.

The first core may have a width greater than a height thereof, and a vertical distance from a top surface of the second core to the bottom surface of the metal pattern may be greater than about 0 μm and less than or equal to about 3 μm.

The first light may be incident into the first core and emitted from the second core.

The first light may be incident into the first core, a portion of the first light may be outputted in a state in which the light is linearly polarized to the second polarization axis through the second core, and the other portion of the first light may be outputted in a state in which the light is linearly polarized to the first polarization axis through the first core.

The second polarization axis may rotate at an angle of about 90 degrees with respect to the first polarization axis.

The metal pattern may include a second side surface facing the first side surface, and the second side surface may be vertically aligned with a side surface of the substrate.

In an embodiment of the inventive concept, a polarization controller includes: a first cladding layer including a protrusion having a flat line shape; a core disposed on the protrusion and having a long rectangular parallelepiped shape; a second cladding layer disposed on the core; a third cladding layer configured to cover the second cladding layer, a sidewall of the core, and the first cladding layer and having a recessed region in an upper portion thereof; and a metal pattern disposed in the recessed region and including a first side surface and a bottom surface, which are adjacent to the core. The polarization controller may receive first light that is linearly polarized to a first polarization axis to output light that is linearly polarized to a second polarization axis rotating at a predetermined angle with respect to the first polarization axis.

In an embodiment of the inventive concept, a polarization controller includes: first and second cores disposed on a substrate, having line shapes parallel to each other, and spaced apart from each other; a cladding layer configured to cover the first and second cores; and a metal pattern disposed on the cladding layer and including a first side surface and a bottom surface, which are adjacent to one of the first and second cores, wherein the first core has a width equal to a height of the second core, and the first core has a height equal to a width of the second core.

The first core may include a first inlet and a first outlet, and the second core may include a second inlet and a second outlet. First light that is linearly polarized to a first polarization axis may be incident into one of the first inlet and the second inlet and emitted from one of the first outlet and the second outlet. The first light that is linearly polarized to the first polarization axis may be incident into one of the first inlet and the second inlet and emitted from all of the first outlet and the second outlet.

The first core and the second core may have the same effective reflective index.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
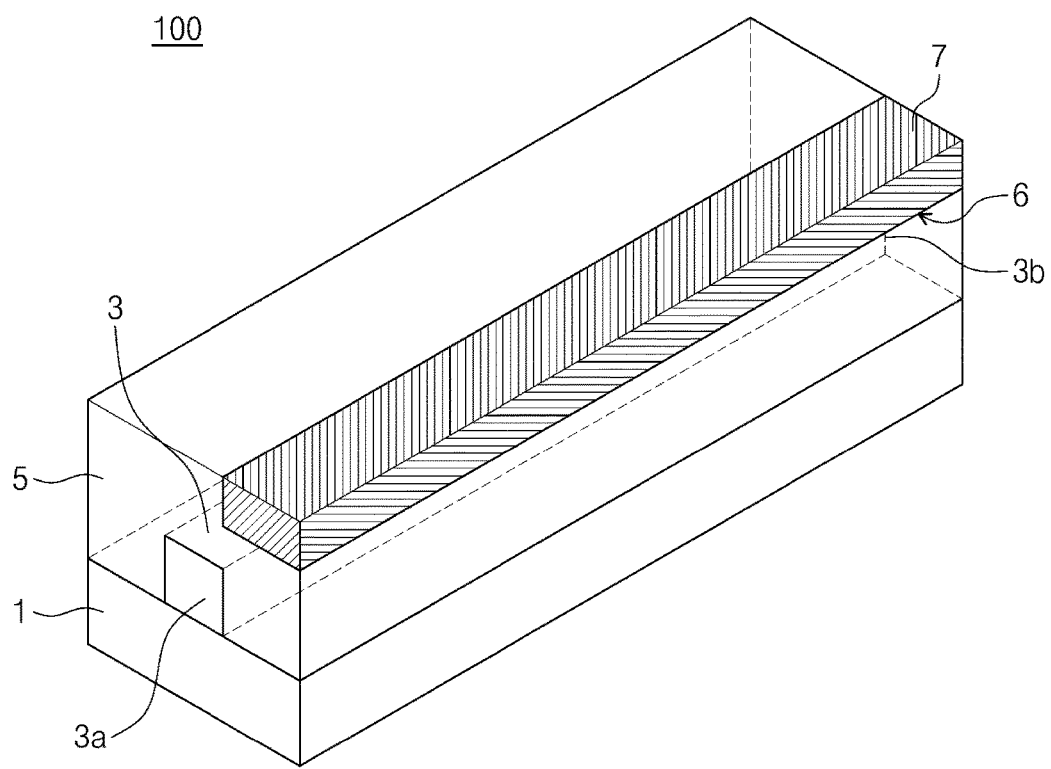
FIG. 1 is a perspective view illustrating an example of a polarization controller according to the inventive concept.

The objects, other objectives, features, and advantages of the inventive concept will be understood without difficulties through preferred embodiments below related to the accompanying drawings. The present disclosure may, however, be embodied in different forms and should not be construed as limited to the embodiments set forth herein. Rather, these embodiments are provided so that this disclosure will be thorough and complete, and will fully convey the scope of the present invention to those skilled in the art.

In this specification, it will also be understood that when another component is referred to as being 'on' one component, it can be directly on the one component, or an intervening third component may also be present. Also, in the figures, the dimensions of layers and regions are exaggerated for clarity of illustration.

The embodiment in the detailed description will be described with cross-sectional views and/or plan views as ideal exemplary views of the inventive concept. In the figures, the dimensions of layers and regions are exaggerated for clarity of illustration. Accordingly, shapes of the exemplary views may be modified according to manufacturing techniques and/or allowable errors. Therefore, the embodiments of the present invention are not limited to the specific shape illustrated in the exemplary views, but may include other shapes that may be created according to manufacturing processes. For example, an etched region illustrated as a rectangle may be rounded or have a shape with a predetermine curvature. Areas exemplified in the drawings have general properties and are used to illustrate a specific shape of a device. Thus, this should not be construed as limited to the scope of the inventive concept. Also, though terms like a first and a second are used to describe various regions and layers in various embodiments of the inventive concept, the regions and the layers are not limited to these terms. These terms are only used to distinguish one component from another component. Embodiments described and exemplified herein include complementary embodiments thereof.

In the following description, the technical terms are used only for explaining a specific exemplary embodiment while not limiting the inventive concept. In this specification, the terms of a singular form may include plural forms unless specifically mentioned. The meaning of 'comprises' and/or 'comprising' does not exclude other components besides a mentioned component.

Hereinafter, embodiments of the inventive concept will be described in detail with reference to the accompanying drawings.

Figure 2A:
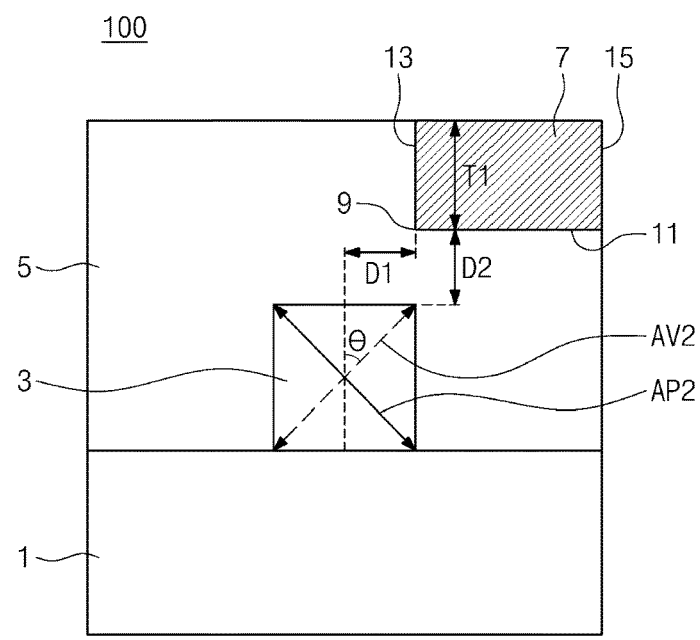
FIGS. 2A and 2B are cross-sectional views of FIG. 1.
Figure 2B:
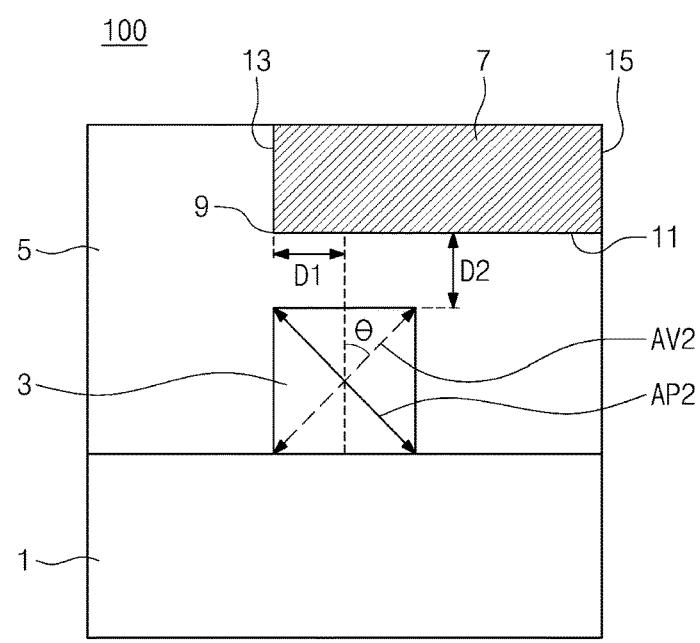
Figure 3:
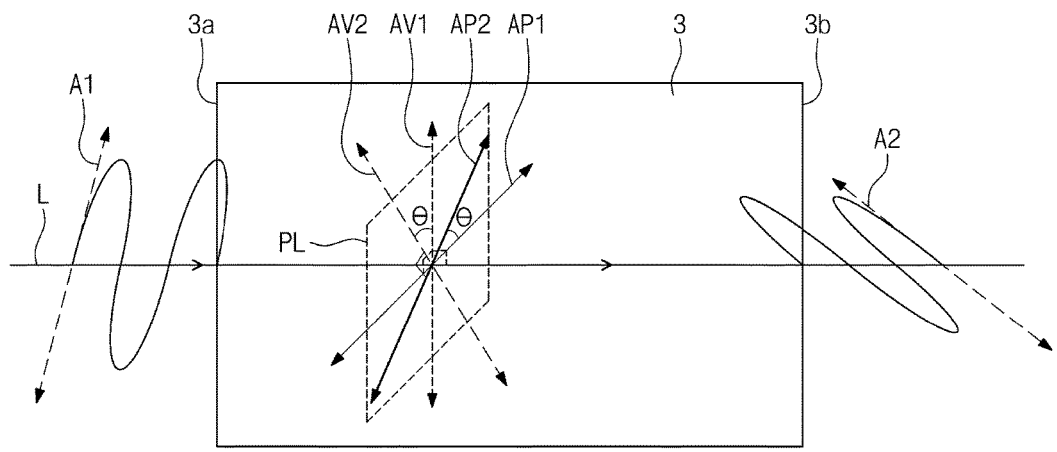
FIG. 3 is a schematic view illustrating a state of light in the polarization controller of FIG. 1.

FIG. 1 is a perspective view illustrating an example of a polarization controller according to the inventive concept. FIGS. 2A and 2B are cross-sectional views of FIG. 1. FIG. 3 is a schematic view illustrating a state of light in the polarization controller of FIG. 1.

Referring to FIGS. 1 to 3, a core 3 is disposed on a substrate 1. The core 3 may be called an optical waveguide. The substrate 1 may be called a (lower) cladding layer. The core 3 has a line shape that extends in one direction. The core 3 has an inlet 3a through which light L is incident and an outlet 3b through which the light L is emitted. The core 3 may have a long rectangular parallelepiped shape with the same thickness and width from the inlet 3a to the outlet 3b. The core 3 is covered by the (upper) cladding layer 5. A long groove 6 along the core 3 is defined in an upper end of one edge of the cladding layer 5. A metal pattern 7 is disposed in the groove 6.

The core 3 may be formed of a material having a reflective index greater than that of each of the substrate 1 and the cladding layer 5. Particularly, for example, each of the substrate 1 and the cladding layer 5 may be formed of silica ($SiO_2$) or a polymer, and the core 3 may be formed of silicon or silicon nitride. The metal pattern 7 may be formed of, for example, gold, sliver, aluminum, copper, chrome, tungsten, platinum, nickel, cobalt, or titanium.

Referring to FIGS. 2A and 2B, the metal pattern 7 includes a lower edge 9 adjacent to the core 3 and a lower surface 11 and a first side surface 13, which are connected to the lower edge 9. The metal pattern 7 further includes a second side surface 15 facing the first side surface 13. The second side surface 15 may vertically overlap a side surface of the substrate 1 or a side surface of the cladding layer 5. A horizontal distance D1 from a center of the core 3 to the first side surface 13 may be greater than about 0 μm and less than or equal to about 3 μm. The first side surface 13 may be spaced apart from the center of the core 3 in a right direction as illustrated in FIG. 2A so that the metal pattern 7 does almost non-overlap the core 3. Alternatively, the first side surface 13 may be spaced apart from the center of the core 3 in a left direction as illustrated in FIG. 2B so that the metal pattern 7 overlaps a substantial portion of the core 3. A vertical distance D2 from a top surface of the core 3 to a bottom surface of the metal pattern 7 may be greater than about 0 μm and less than or equal to about 3 μm. The metal pattern 7 may have a thickness T1 of about 100 nm to about 5 μm.

Referring to FIGS. 1, 2A, 2B, and 3, the light L that is linearly polarized to a first polarization axis A1 is incident into the core 3. If the metal pattern 7 is not provided, the light L is divided into a component that oscillates with a first horizontal axis AP1 and a component that oscillates with a first vertical axis AV1, which are orthogonal to each other, within the core 3 (or in a region adjacent to the core 3) to proceed. Then, when the light L exits the core 3, the horizontal component and the vertical component may be combined again with each other and have the first polarization axis A1.

For example, the first horizontal axis AP1 may be a TE mode axis, and the first vertical axis AV1 may be a TM mode axis. The polarization controller 100 according to the inventive concept may include the metal pattern 7. Here, an orthogonal optical axis defined by the first vertical axis AV1 and the first horizontal axis AP1 rotates a first angle θ on a predetermined plane PL that is perpendicular to the proceeding direction of the light L due to an influence of the first side surface 13 and the bottom surface 11 (i.e., two metal surfaces), which are adjacent to the lower edge 9 of the metal pattern 7. That is, the light L may be divided into a component that oscillates with a second vertical axis AV2 rotating at the first angle θ from the first vertical axis AV1 and a component that oscillates with a second horizontal axis AP2 rotating at the first angle θ from the first horizontal axis AP1 to proceed. Then, the light L passing through the outlet 3b of the core 3 is linearly polarized to a second polarization axis A2 that rotates by a second angle with respect to the first polarization axis A1. The second angle may be twice the first angle θ. If the first angle θ is, for example, about 45 degrees, the second angle may be, for example, about 90 degrees. Here, when the TM light is incident into the core 3, the light emitted from the core 3 may be the TE light (that is light rotating by about 90 degrees from the TM light). Alternatively, when the TM light is incident into the core 3, the light emitted from the core 3 may be the TE light (that is light rotating by about 90 degrees from the TM light). The TM light in this specification may mean linearly polarized light having a polarization axis oscillating vertically, and the TE light may mean linearly polarized light having a polarization axis oscillating horizontally.

Light used for optical communication may mainly have a wavelength of about 1.5 μm. Each of the horizontal distance D1 and the vertical distance D2, i.e., the distance of about 3 μm may correspond to about twice a wavelength of the light used for the optical communication. When the horizontal and vertical distances D1 and D2 and the thickness of the metal pattern 7 are beyond the above-described ranges, an influence due to the plasmon on the surface of the metal may be insignificant, and thus, the rotation of the light does not occur well. Also, materials forming the substrate 1, the core 3, and the cladding layer 5 and the horizontal and vertical distances D1 and D2 may be adjusted to change the first angle θ and the second angle. When the above-described materials and angles are adequately adjusted, the linearly polarized light may rotate at a desired angle.

The polarization controller 100 of FIG. 1 may use the plasmon phenomenon on the two metal surfaces in the channel-type core and be called a polarization rotator.

Figure 4:
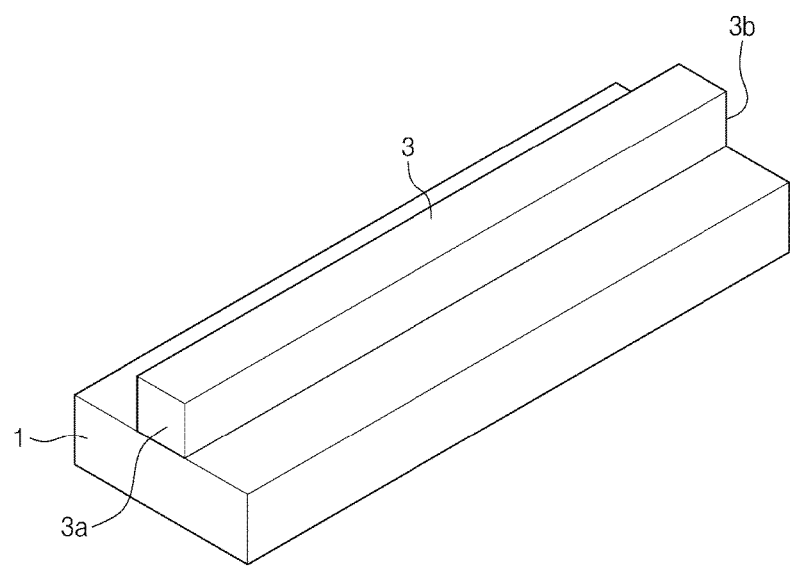
FIGS. 4 and 5 are perspective views sequentially illustrating a process of manufacturing the polarization controller of FIG. 1.
Figure 5:
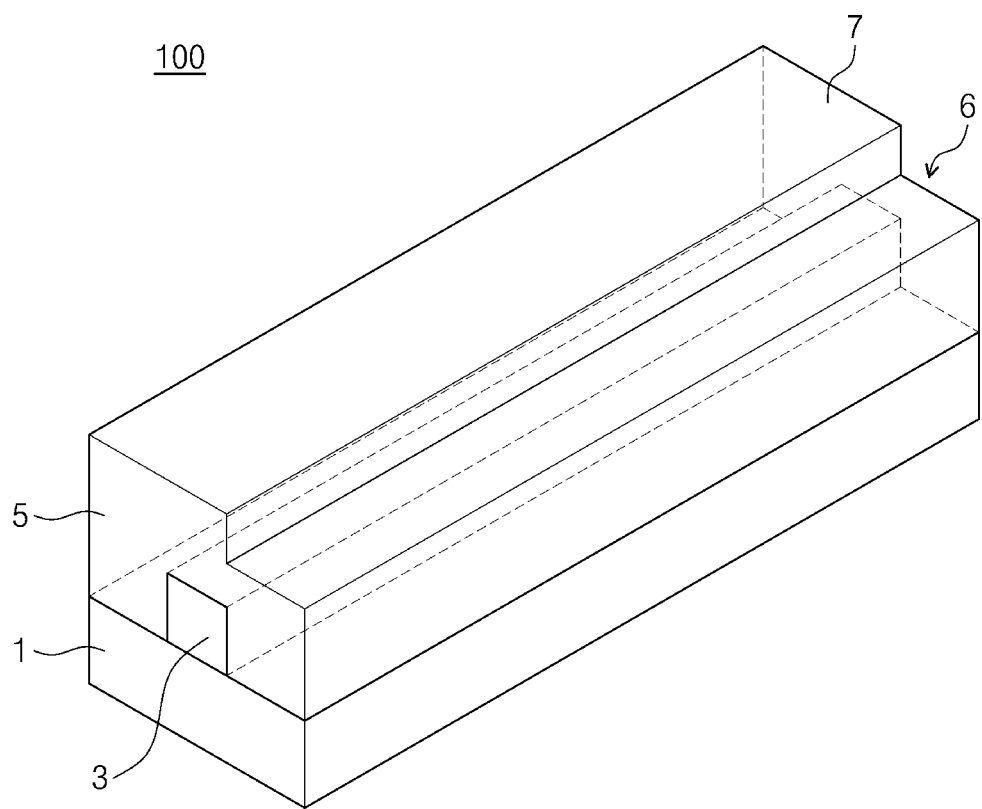

FIGS. 4 and 5 are perspective views sequentially illustrating a process of manufacturing the polarization controller of FIG. 1.

Referring to FIG. 4, a substrate 1 is prepared. The substrate 1 may be formed of, for example, silica ($SiO_2$). A core 3 (or that is called an optical waveguide) is formed on the substrate 1. The core 3 may be formed of, for example, silicon or silicon nitride. The core 3 may be formed by depositing and etching a layer constituting the core 3. Alternatively, the core 3 may be formed through a damascene process. The core 3 has a line shape that extends in one direction. The core 3 has an inlet 3a through which light L is incident and an outlet 3b. The core 3 may have a long rectangular parallelepiped shape with the same thickness and width from the inlet 3a to the outlet 3b.

Referring to FIG. 5, a cladding layer 5 covering the core 3 and the substrate 1 is formed. The cladding layer 5 may be formed through a deposition process. An edge portion of an upper end of the cladding layer 5 may be etched to form a groove 6. The groove 6 may have a groove shape extending along the core 3.

Referring again to FIG. 1, a metal layer may be deposited to fill the groove 6, and the metal layer except for the groove 6 may be removed to expose top and side surfaces of the cladding layer 5.

Since the polarization controller is manufactured through the deposition or etching process as described above, the polarization controller may be manufactured with a small (miniaturized) size.

Figure 6A:
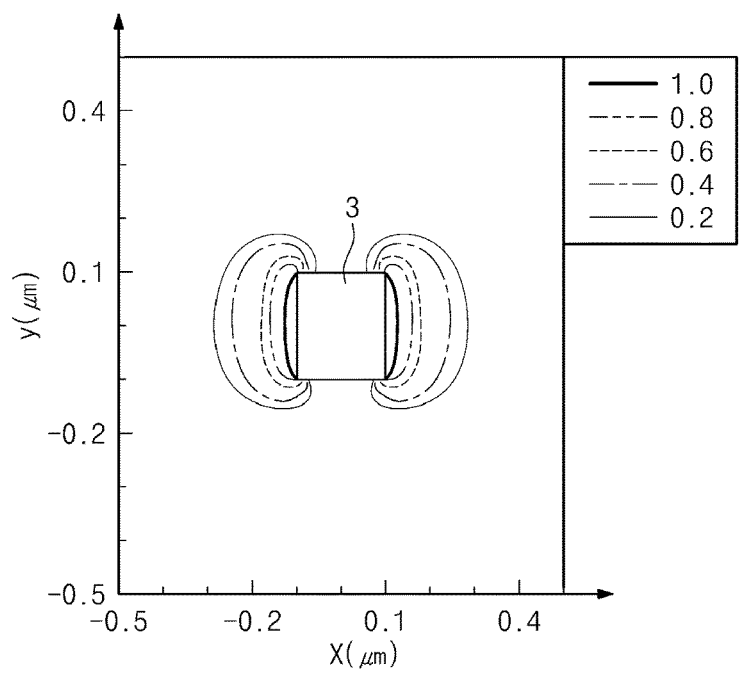
FIGS. 6A and 6B are views illustrating distribution of light around a core when a metal pattern is not provided around the core in a channel-type optical waveguide structure.
Figure 6B:
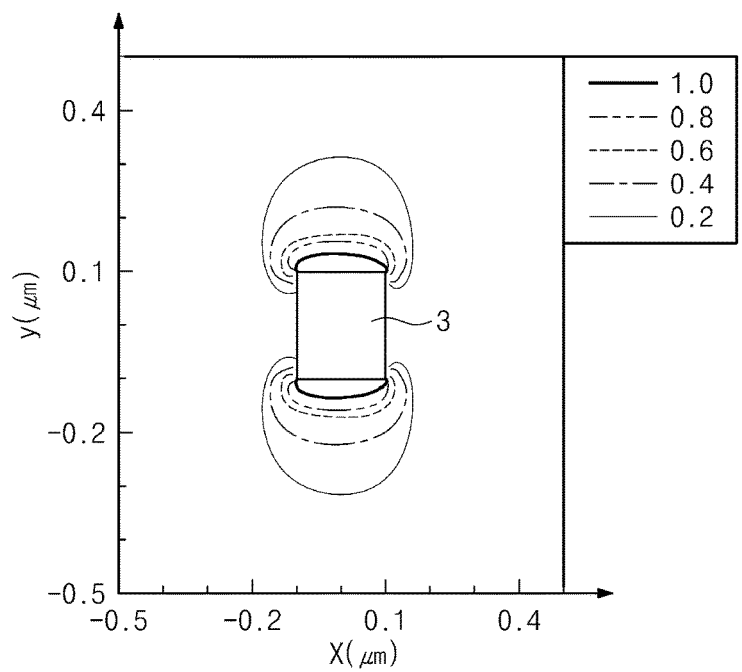
Figure 7A:
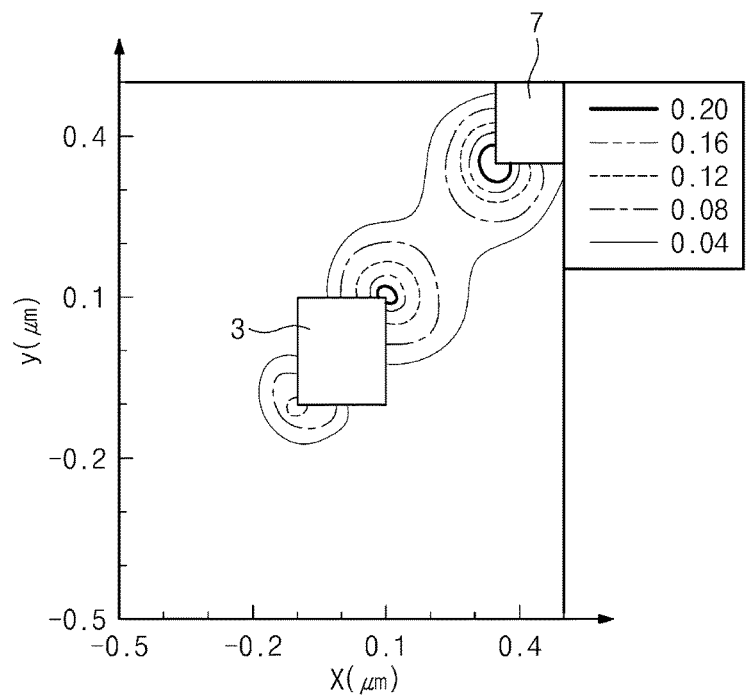
FIGS. 7A and 7B are views illustrating distribution of light around the core when the metal pattern is provided around the core in the channel-type optical waveguide structure according to the inventive concept.
Figure 7B:
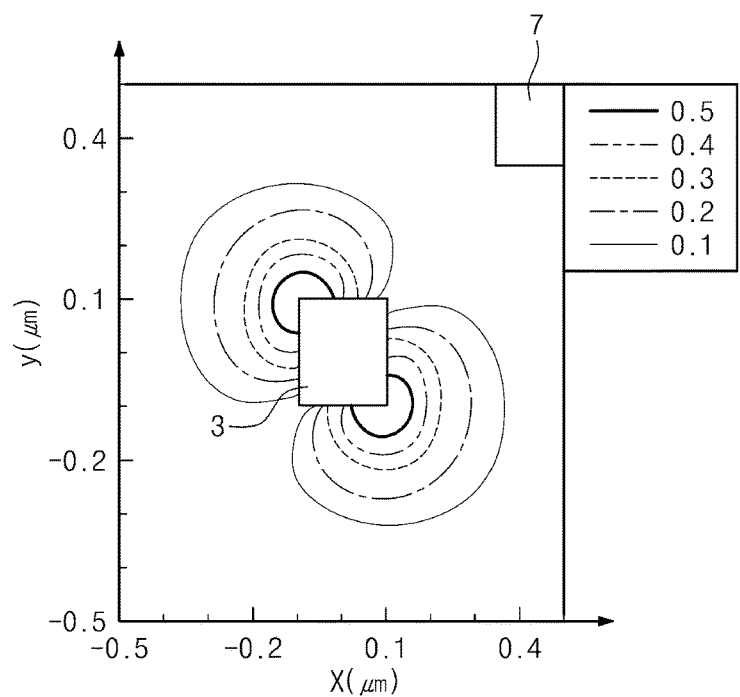

FIGS. 6A and 6B are views illustrating distribution in intensity of light around the core when the metal pattern is not provided around the core in the channel-type optical waveguide structure. FIGS. 7A and 7B are views illustrating distribution in intensity of light around the core when the metal pattern is provided around the core in the channel-type optical waveguide structure according to the inventive concept. In FIGS. 6A, 6B, 7A, and 7B, numbers in boxes represent quantitative intensities of light.

Referring to FIGS. 6A, 6B, 7A, and 7B, the cores may have the same size, i.e., about 200 nm in length and width. In FIGS. 7A and 7B, the metal pattern is formed of gold. Also, a horizontal distance from a center of the core to the metal pattern is about 350 nm, and a vertical distance from a top surface of the core to a bottom surface of the metal pattern is about 250 nm. In FIGS. 6A, 6B, 7A, and 7B, the core is formed of silicon, and each of the cladding layer and the substrate around the core has a refractive index of about 1.444. Also, incident light has a wavelength of about 1.55 μm. FIGS. 6A and 7A illustrate distribution of electric fields in a TE mode, and FIGS. 6B and 7B illustrate distribution of electric fields in a TM mode. Referring to FIGS. 6A and 7A, a state in which the TE mode rotates at an angle of about 45 degrees by an influence of the two metal surfaces of the metal pattern is illustrated in FIG. 7A. Referring to FIGS. 6B and 7B, a state in which the TM mode rotates at an angle of about 45 degrees by the influence of the two metal surfaces of the metal pattern is illustrated in FIG. 7B. In FIGS. 6A and 6B, all of the cores have an effective reflective index of about 1.4759. In FIGS. 7A and 7B, the cores have effective reflective indexes of 1.5238+0.00279i and 1.4663+0.00021i, respectively. In a retardation phase shift expressed as the following equation: $\Gamma=2\pi(\beta1-\beta2)L$, each of $\beta1,2$ represents an effective reflective index in each mode, and L is a total length. Here, a length for half-wave ($\pi$) retardation is about 8.7 μm, and an absorption loss occurring at the length of the half-wave ($\pi$) retardation is about 0.43 dB that corresponds to a half of the sum of absorption losses in the two modes.

Figure 8A:
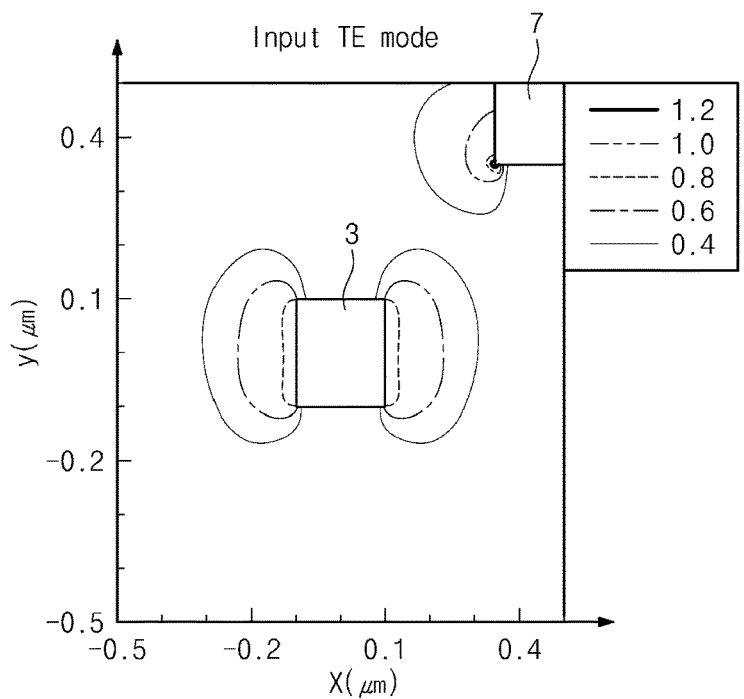
FIGS. 8A and 8B are views illustrating an input when a TE mode is inputted into a polarization rotator described in FIG. 7A and an output after passing through a length of about 8.7 μm.
Figure 8B:
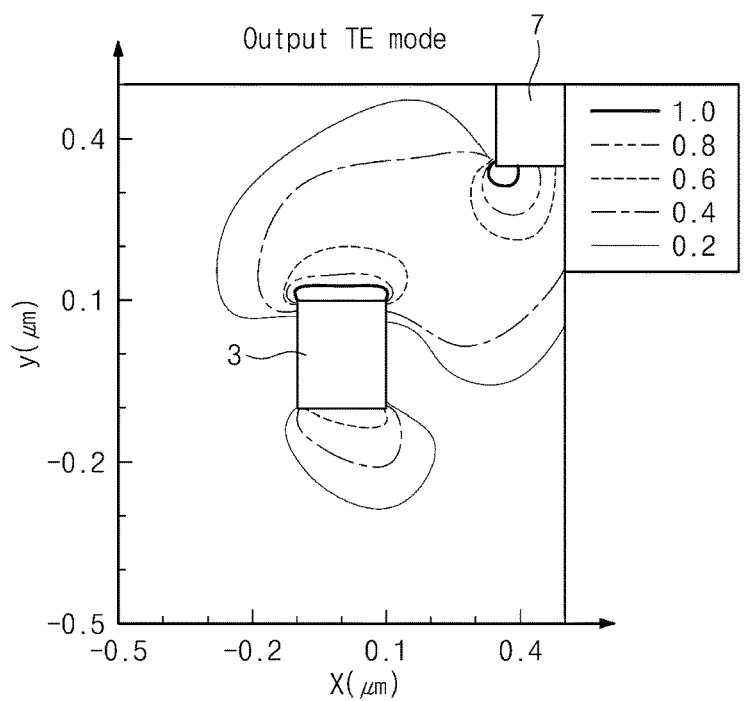
Figure 8C:
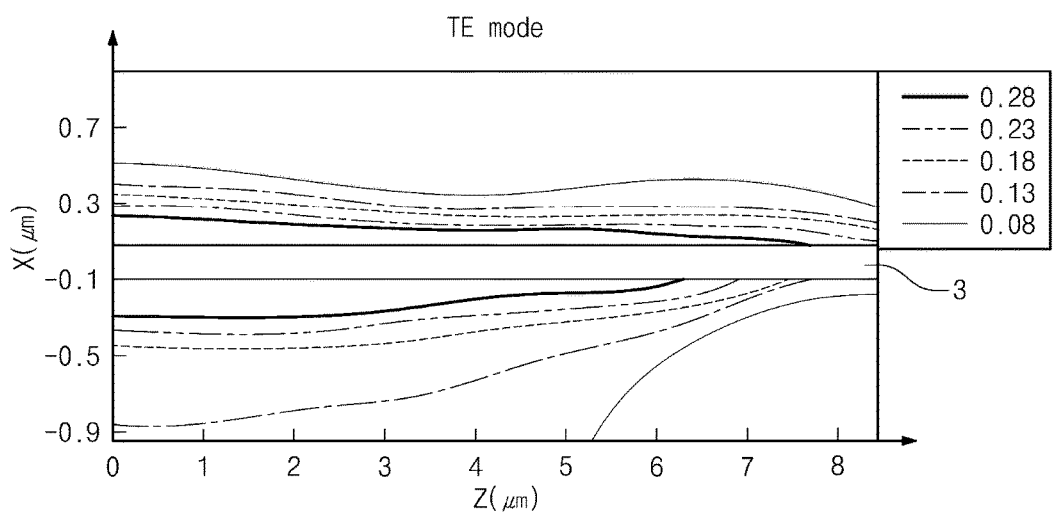
FIGS. 8C and 8D are views illustrating distribution of electric fields in a TE mode and a TM mode in a longitudinal direction of the core when the TE mode is inputted into the polarization rotator described in FIG. 7A.
Figure 8D:
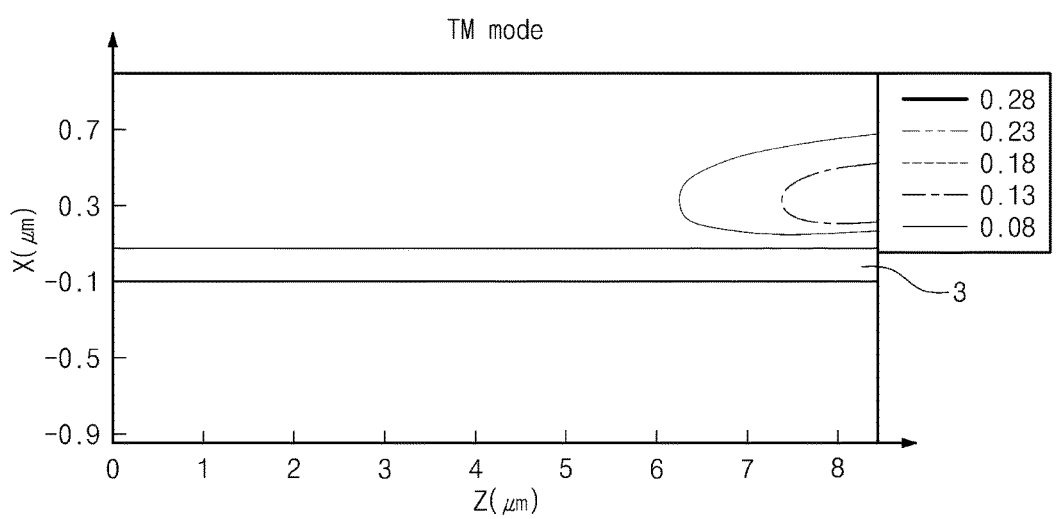

FIGS. 8A and 8B are views illustrating an input when the TE mode is inputted into the polarization rotator described in FIG. 7A and an output after passing through a length of about 8.7 μm. FIGS. 8C and 8D are views illustrating distribution of electric fields in the TE mode and the TM mode in a longitudinal direction of the core when the TE mode is inputted into the polarization rotator described in FIG. 7A. Referring to FIGS. 8A to 8D, it is seen that the TE mode is inputted to output the TM mode in which the TE mode rotates at an angle of about 90 degrees.

Figure 9:
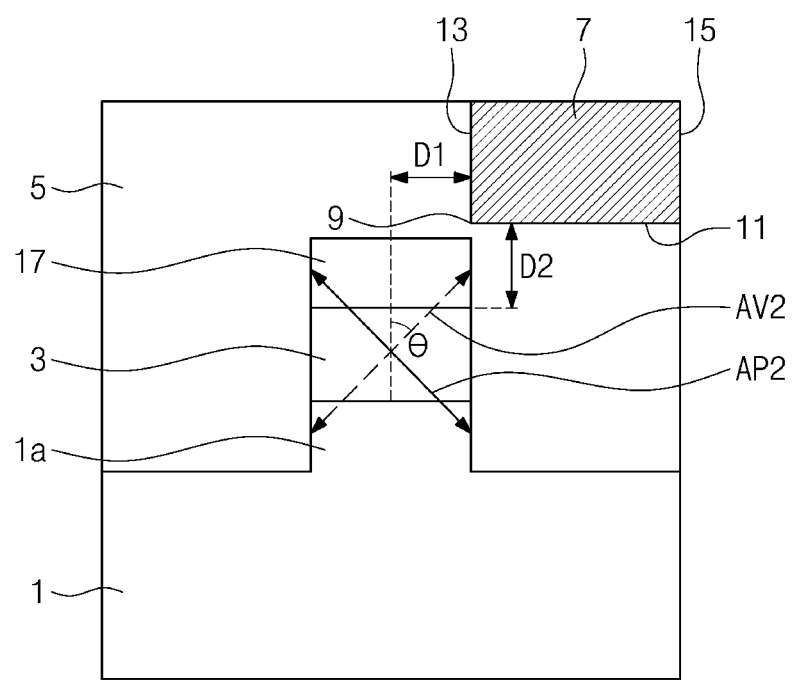
FIG. 9 is a cross-sectional view illustrating another example of the polarization controller according to the inventive concept.

FIG. 9 is a cross-sectional view illustrating another example of the polarization controller according to the inventive concept.

Referring to FIG. 9, a polarization controller 101 according to this example may include a ridge-type optical waveguide. The polarization controller 101 has a protrusion 1a in which ha portion of a substrate 1 protrudes toward a core 3. The substrate 1 may be called a lower cladding layer. A first classing layer 17 is disposed on the core 3. Top and side surfaces of the first cladding layer 17, a side surface of the core 3, a side surface of the protrusion 1a, and a top surface of the substrate 1 are covered by a second cladding layer 5. A groove is defined in an edge of one upper end of the second cladding layer 5, and a metal pattern 7 is disposed in the groove. The metal pattern 7 includes a first side surface 13 and a bottom surface 11, which are adjacent to the core 3, and a second side surface 15 facing the first side surface 13.

Although not shown, in FIG. 9, a separate-confinement heterostructure (SCH) layer may be disposed between the protrusion 1a and the core 3 and between the core 3 and the first cladding layer 17. The SCH layer may be formed of, for example, InGaAsP. Each of the substrate 1, the core 3, and the first and second cladding layers 17 and 5 may be formed of a compound semiconductor material. For example, the substrate 1 may be formed of N-type InP, and the core 3 may be formed of InGaAsP. Alternatively, the core 3 may be formed of InGaAlAs, GaAs, InGaAs, AlInAs, or GaN. The first cladding layer 17 may be formed of, for example, InP. The second cladding layer 5 may be provided as, for example, an oxide layer or an insulation layer such as a polymer.

The metal pattern 7 may be formed of, for example, gold, sliver, aluminum, copper, chrome, tungsten, platinum, nickel, cobalt, or titanium. Each of the core 3 and the first cladding layer 17 may be formed through, for example, a selective epitaxial growth method.

A horizontal distance D1 from a center of the core 3 to the first side surface 13 may be greater than about 0 μm and less than or equal to about 3 μm. A vertical distance D2 from a top surface of the core 3 to a bottom surface of the metal pattern 7 may be greater than about 0 μm and less than or equal to about 3 μm. The metal pattern 7 may have a thickness of about 100 nm to about 5 μm. As described with reference to FIG. 3, in the polarization controller 101 of FIG. 9, a polarization axis of light may rotate by a plasmon phenomenon due to the two metal surfaces of the metal pattern 7. The metal pattern 7 may come into contact with the first cladding layer 17.

Figure 10A:
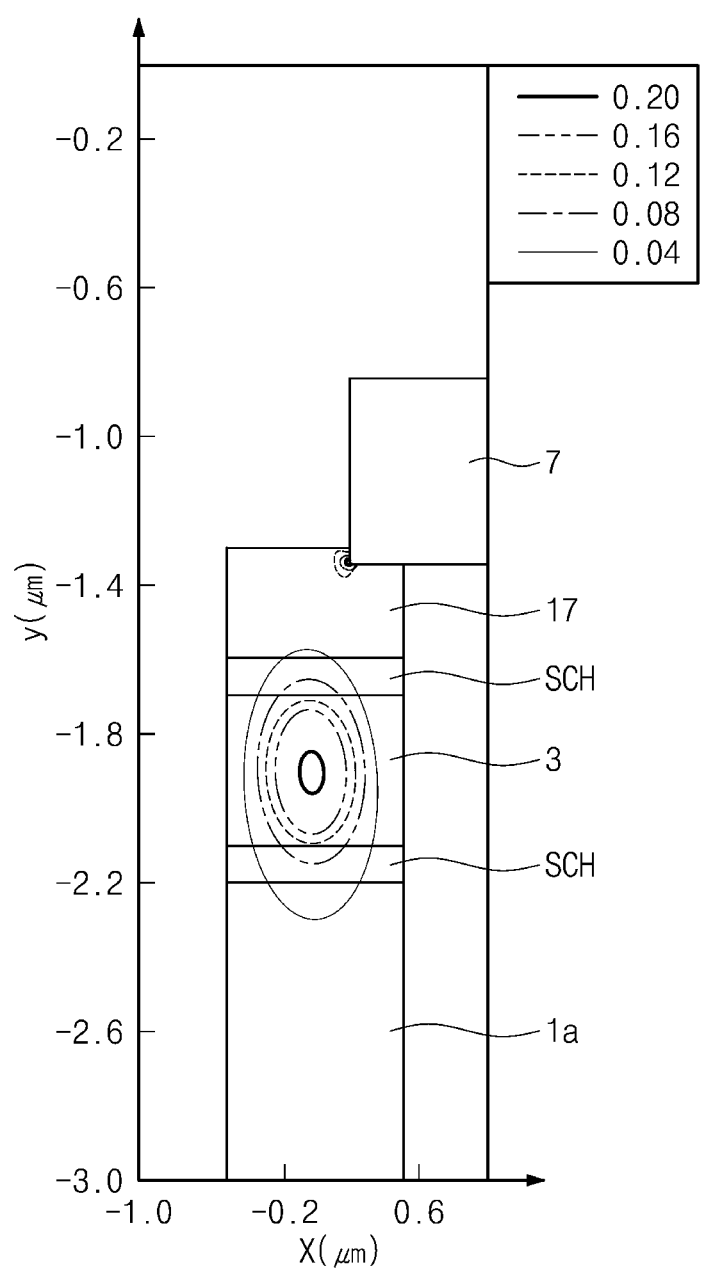
FIGS. 10A and 10B are views illustrating distribution of light around a core when a metal pattern is provided around the core in a ridge-type optical waveguide structure.
Figure 10B:
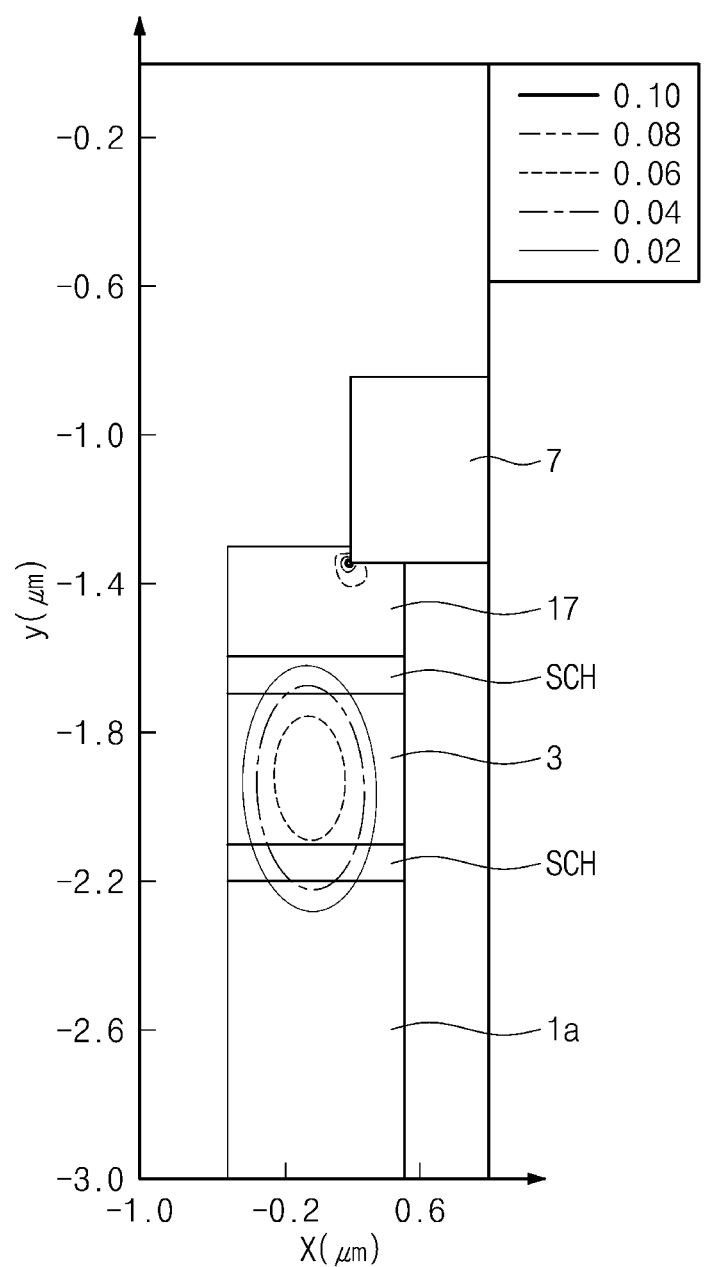

FIGS. 10A and 10B are views illustrating distribution of light around the core when the metal pattern is provided around the core in the ridge-type optical waveguide structure.

Referring to FIGS. 10A and 10B, it is seen that the polarization axis of light is tilted by the plasmon phenomenon due to the two metal surfaces of the metal pattern 7. In FIGS. 10A and 10B, the cores have effective reflective indexes of about 3.2014+0.00081i and about 3.19064+0.00285i, respectively.

Figure 11A:
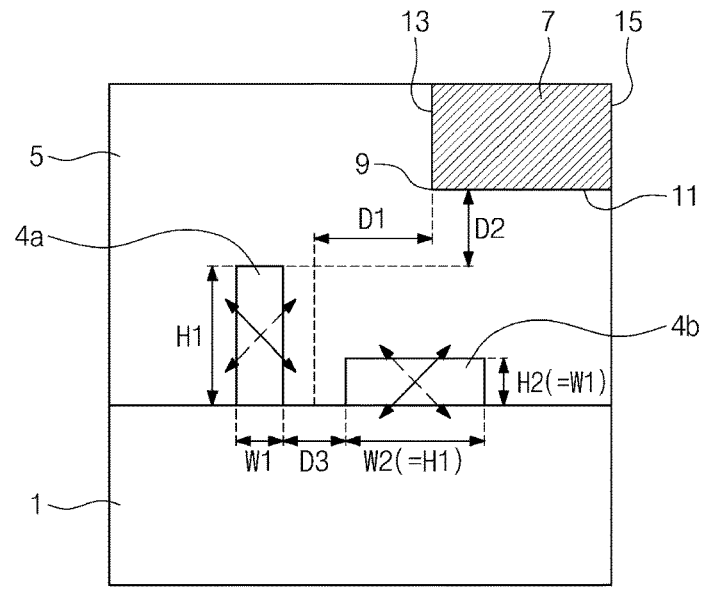
FIGS. 11A and 11B are cross-sectional views illustrating other examples of the polarization controller according to the inventive concept.
Figure 11B:
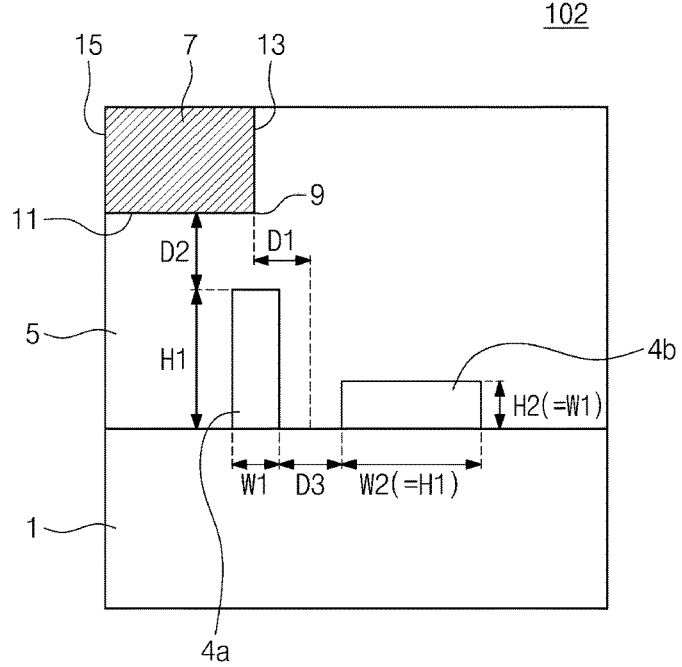

FIGS. 11A and 11B are cross-sectional views illustrating other examples of the polarization controller according to the inventive concept.

Referring to FIGS. 11A and 11B, in a polarization controller 102 according to this example, a first core 4a and a second core 4b, which are disposed adjacent to each other, are disposed on a substrate 1. The first core 4a and the second core 4b are spaced a predetermined distance D3 from each other, and each of the first and second cores 4a and 4b has a long rectangular parallelepiped shape. The first core 4a and the second core 4b may have the same length. A first height H1 of the first core 4a may be the same as a second width W2 of the second core 4b. A first width W1 of the first core 4a may be the same as a second height H2 of the second core 4b. A distance D3 between the first core 4a and the second core 4b may range from about 100 nm to about 3 μm. A metal pattern 7 is disposed on the first core 4a and the second core 4b. The metal pattern 7 includes a first side surface 13 and a bottom surface 11, which are adjacent to one of the first core 4a and the second core 4b. The metal pattern 7 may be adjacent to the second core 4b as illustrated in FIG. 11A or be adjacent to the first core 4a as illustrated in FIG. 11b.

A horizontal distance D1 from a middle point between the first core 4a and the second core 4b to the first side surface may be greater than about 0 μm and less than or equal to about 3 μm. The metal pattern may be spaced apart from all of the first core 4a and the second core 4b. The first core 4a and the second core 4b may have the same effective reflective index. A vertical distance D2 from the bottom surface 11 of the metal pattern 7 to a top surface of the first core 4a, which is relatively high, of the first core 4a and the second core 4b may be greater than about 0 μm and less than or equal to about 3 μm.

Each of the first and second cores 4a and 4b may be formed of a material having a reflective index greater than that of each of the substrate 1 and the cladding layer 5. Particularly, for example, each of the substrate 1 and the cladding layer 5 may be formed of silica ($SiO_2$) or a polymer, and each of the first and second cores 4a and 4b may be formed of silicon or silicon nitride. The metal pattern 7 may be formed of, for example, gold, sliver, aluminum, copper, chrome, tungsten, platinum, nickel, cobalt, or titanium.

The polarization controller 102 may be formed through deposition and etching process similar to those described with reference to FIGS. 4 and 5 and thus be manufactured with a small/miniaturized size.

A TM mode that oscillates in a vertical direction may become a basic mode in the first core 4a, and a TE mode that oscillates in a horizontal direction may become a basic mode in the second core 4b. If the metal pattern 7 is not provided, since the TM mode and the TE mode are perpendicular to each other, the TM mode and the TE mode may not react (be coupled to) with each other. However, the metal pattern 7 may be provided on the first core 4a and the second core 4b to generate the surface plasmon on the two metal surfaces (the first side surface 13 and the bottom surface 11) connected to the lower edge 9 of the metal pattern 7. Thus, an optical waveguide mode within the first core 4a and the second core 4b may be affected by the surface plasmon to allow the orthogonal optical axis to rotate. When the rotating angle of the orthogonal optical axis is about 45 degrees, power of the TM mode and the TE mode, which are respectively incident into the first core 4a and the second core 4b, are equally distributed to two optical axes to generate interaction between the optical waveguide modes that are disposed on the same axis, thereby causing an optical coupling phenomenon.

Figure 12A:
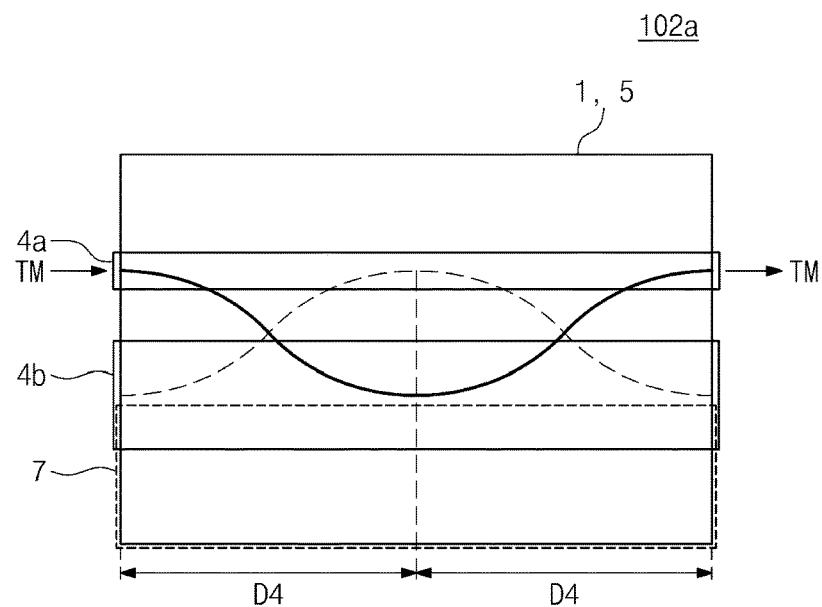
FIGS. 12A to 12C are plan views illustrating a flow of light according to lengths of cores in the polarization controller of FIG. 11A.
Figure 12B:
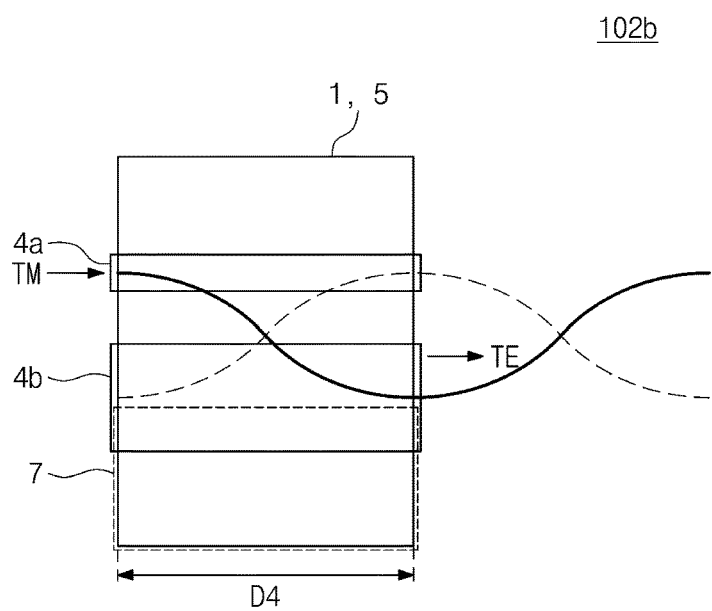
Figure 12C:
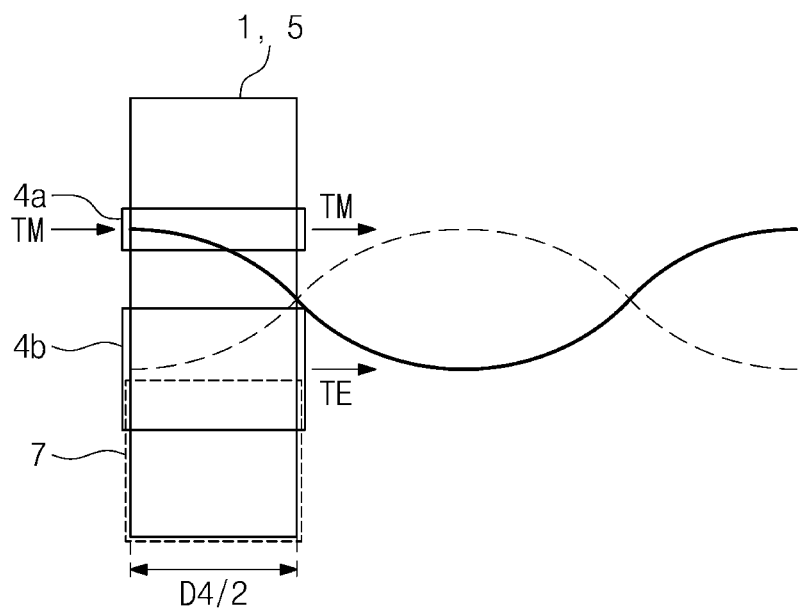

FIGS. 12A to 12C are plan views illustrating a flow of light according to lengths of cores in the polarization controller of FIG. 11A.

Referring to FIGS. 12A to 12C, when the light having the TM mode is incident into the first core 4a, the light may pass through the cladding layer 5 due to the optical coupling phenomenon and then move to the second core 4b and be converted into the light having the TE mode. Thereafter, the light may be incident again into the first core 4a and converted again into the light having the TM mode. A length D4 of the first core 4a, in which the light having the TM mode completely passes from the first core 4a to the second core 4b, may be called a complete coupling length.

Referring to FIG. 12A, in a polarization controller 120a in which each of the first core 4a and the second core 4b has twice the complete coupling length D4, the TM light incident into the first core 4a may be outputted in a TM state through an outlet of the first core 4a. That is, TM light having power corresponding to 100% of the power of the incident TM light may be outputted from the outlet of the first core 4a.

Referring to FIG. 12B, in a polarization controller 120b in which each of the first core 4a and the second core 4b has the complete coupling length D4, the TM light incident into the first core 4a may be outputted into a TE state through an outlet of the second core 4b. That is, TE light having power corresponding to 100% of the power of the incident TM light may be outputted from the outlet of the second core 4b.

Referring to FIG. 12C, in a polarization controller 120c in which each of the first core 4a and the second core 4b has a length corresponding to a half of the complete coupling length D4, the TM light incident into the first core 4a may be outputted in a TM state through an outlet of the first core 4a and outputted in a TE state through an outlet of the second core 4b. Here, the TM light emitted through the outlet of the first core 4a may have power corresponding to about 50% of that of the TM light incident into the first core 4a, and the TE light emitted through the outlet of the second core 4b may have power corresponding to about 50% of that of the TM light incident into the first core 4a.

The polarization controllers 102 and 102a to 102c described with reference to FIGS. 11a to 12c may called TM-TE mode converters. To increase a polarization extinction ratio, the first width W1 of the first core 4a and the second height H2 of the second core 4b may be reduced to be controlled so that only the TM mode is present in the first core 4a without the TM mode, and only the TE mode is present in the second core 4b without the TM mode. In this case, pure TM-TE mode converters may be obtained.

Referring to FIGS. 12A to 12C, when the first and second cores 4a and 4b are adjusted in length, the output light may be controlled in polarization state or power ratio.

A light emitting device may be disposed on the inlet of the core of the polarization controller according to the examples of the inventive concept, and a light receiving device may be disposed on the outlet of the core. If the circularly polarized light is incident from the light emitting device, and the light receiving device that optimally operates in the linearly polarized state is provided, it is necessity to convert the circularly polarized light into the linearly polarized light. For this, a fiber polarization controller in which an optical fiber is bent a circular shape with a specific diameter is used, or a half-wave plate or a quarter-wave plate having a film shape, in which a support structure is required, is used according to the related art. However, there is a limitation in reducing a size of the fiber polarization controller, the half0wave plate, or the quarter-wave plate. On the other hand, when the polarization controller described with reference to FIGS. 11A to 12C is used, the polarization having the small/miniaturized size may be realized.

In the polarization controller according to the inventive concept, the polarization axis of the linearly polarized light may rotate by using the plasmon phenomenon on the bottom surface and the side surface of the metal pattern. Thus, the TE light may be converted into the TM light, or the TM light may be converted into the TE light by using the polarization controller.

Also, the polarization controller according to the inventive concept may be manufactured by using the deposition or etching process without requiring the external case for fixing the existing half-wave plate having the film shape. Therefore, the polarization controller may be manufactured with the small (miniaturized) size to realize the integrated half-wave plate.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:
1. A polarization controller comprising:
   a substrate;
   a first core disposed on the substrate and having a rectangular parallelepiped shape;
   a first cladding layer configured to cover the first core and the substrate and comprising a groove at an edge of an upper end of the first cladding layer, the groove being parallel to the first core and spaced apart from the first core; and
   a metal pattern disposed in the groove and comprising a first side surface and a bottom surface, the metal pattern including an edge where the side surface meets the bottom surface, the bottom surface of the metal pattern facing a top surface of the first core and spaced apart from the top surface of the first core,
   wherein a distance from a horizontal center of the first core to the edge of the metal pattern, in a first direction, is less than or equal to a distance from the horizontal center of the core to a side of the core, in the first direction.
2. The polarization controller of claim 1, wherein a horizontal distance from the horizontal center of the first core to the edge of the metal pattern is greater than about 0 µm and less than or equal to about 3 µm.

3. The polarization controller of claim 1, wherein a vertical distance from the top surface of the first core to the bottom surface of the metal pattern is greater than about 0 µm and less than or equal to about 3 µm.

4. The polarization controller of claim 1, wherein the substrate comprises a protrusion protruding toward the first core, and
the polarization controller further comprises a second cladding layer disposed between the top surface of the first core and the first cladding layer.

5. The polarization controller of claim 1, wherein the metal pattern has a thickness ranging from about 100 nm to about 5 µm.

6. The polarization controller of claim 1, wherein the polarization controller receives first light that is linearly polarized to a first polarization axis to output light that is linearly polarized to a second polarization axis rotated with respect to the first polarization axis.

7. The polarization controller of claim 6, further comprising a second core disposed on the substrate and spaced apart from the first core,
wherein the second core has a height equal to a width of the first core, and
the second core has a width equal to a height of the first core.

8. The polarization controller of claim 7, wherein a distance between the first core and the second core ranges from about 10 nm to about 3 µm.

9. The polarization controller of claim 7, wherein a horizontal distance from a middle point between the first core and the second core to the edge of the metal pattern is greater than about 0 µm and less than or equal to about 3 µm.

10. The polarization controller of claim 7, wherein the metal pattern is spaced apart from both of the first core and the second core.

11. The polarization controller of claim 7, wherein the first core and the second core have a same effective reflective index from each other.

12. The polarization controller of claim 7, wherein the first core has a width greater than a height thereof, and
a vertical distance from a top surface of the second core to the bottom surface of the metal pattern is greater than about 0 µm and less than or equal to about 3 µm.

13. The polarization controller of claim 7, wherein the first light is incident into the first core and emitted from the second core.

14. The polarization controller of claim 7, wherein the first light is incident into the first core,
a portion of the first light is outputted in a state in which the light is linearly polarized to the second polarization axis through the second core, and
the other portion of the first light is outputted in a state in which the light is linearly polarized to the first polarization axis through the first core.

15. The polarization controller of claim 6, wherein the second polarization axis rotates at an angle of about 90 degrees with respect to the first polarization axis.

16. The polarization controller of claim 1, wherein the metal pattern comprises a second side surface facing the first side surface, and the second side surface is vertically aligned with a side surface of the substrate.

17. A polarization controller comprising:
a substrate;
a first core disposed on the substrate and having a rectangular parallelepiped shape;
a first cladding layer configured to cover the first core and the substrate and comprising a groove at an edge of an upper end of the first cladding layer, the groove being parallel to the first core; and
a metal pattern disposed in the groove and comprising a first side surface and a bottom surface, which are adjacent to the first core,
wherein the substrate comprises a protrusion protruding toward the first core, and
the polarization controller further comprises a second cladding layer disposed between a top surface of the first core and the first cladding layer.

* * * * *